Dec. 29, 1964  C. E. MAIER ETAL  3,162,907
APPARATUS FOR THE PRODUCTION OF LAMINATE STRIP
Filed April 4, 1961  3 Sheets-Sheet 1
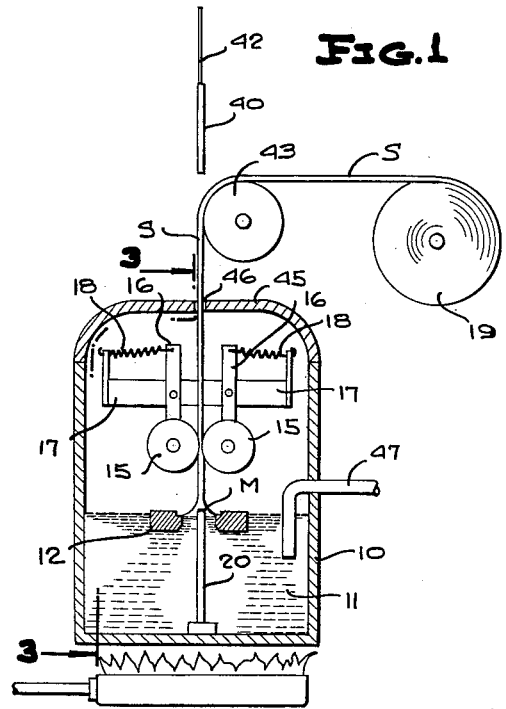
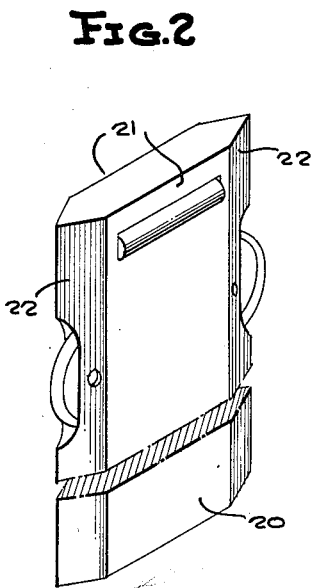
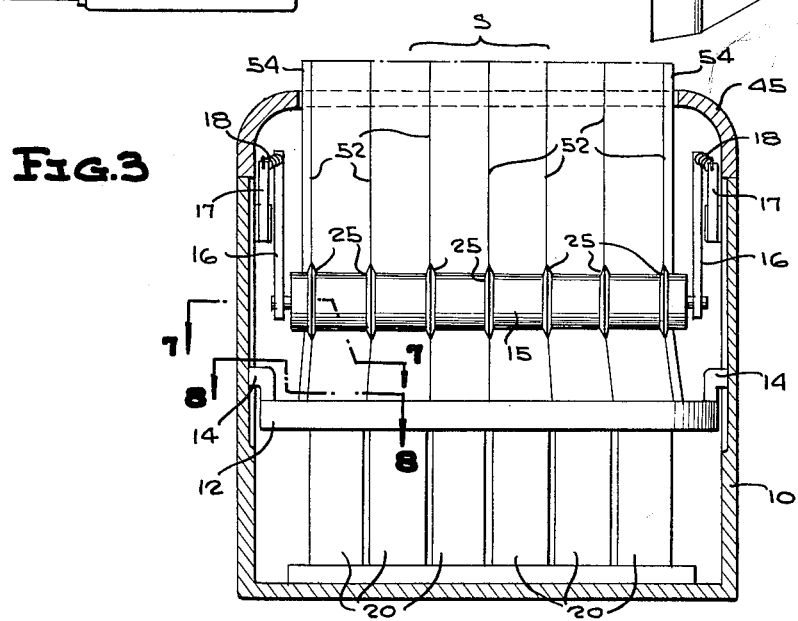
INVENTORS
CURTIS E. MAIER &
ROBERT M. BRICK
BY
Mason, Porter, Diller & Stewart,
ATTORNEYS Dec. 29, 1964  C. E. MAIER ETAL  3,162,907
APPARATUS FOR THE PRODUCTION OF LAMINATE STRIP
Filed April 4, 1961  3 Sheets-Sheet 2
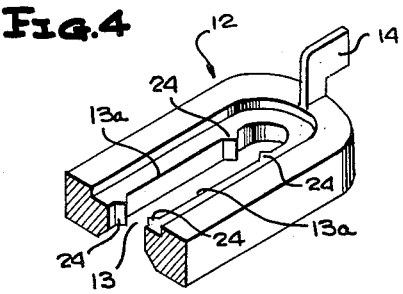
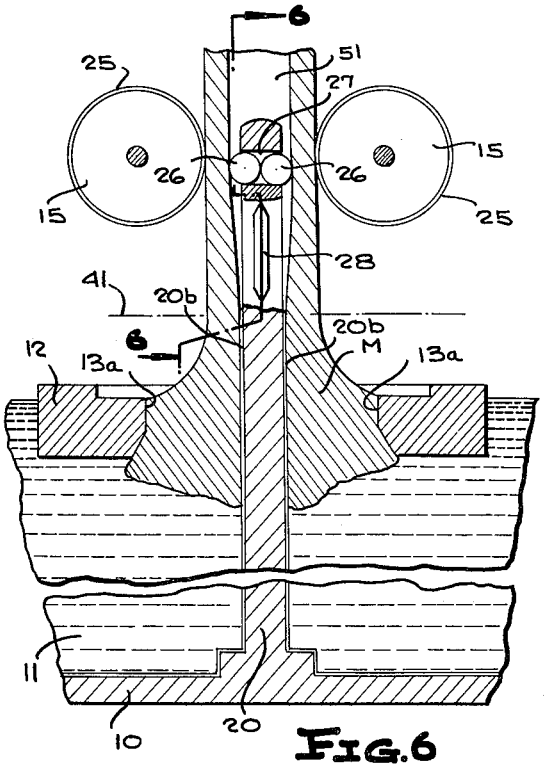
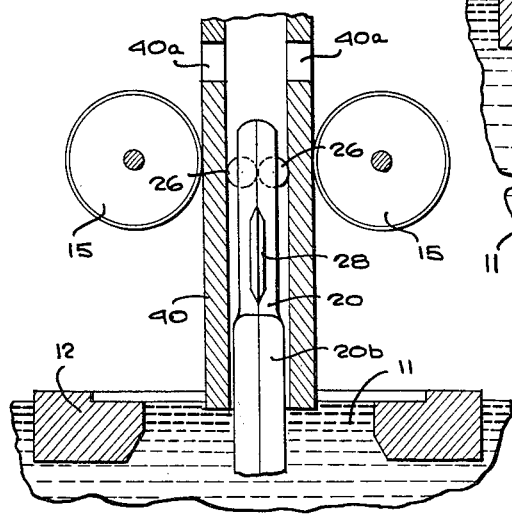
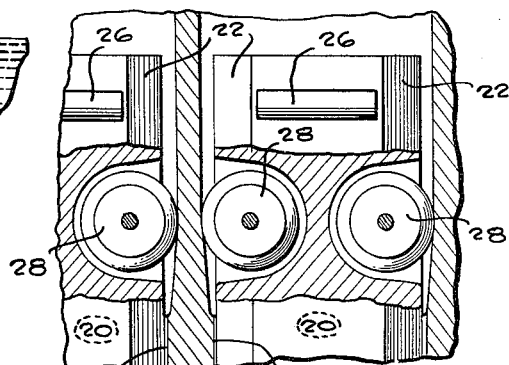
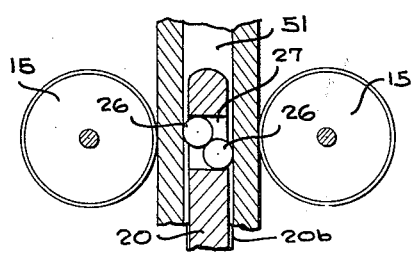
INVENTORS
CURTIS E. MAIER &
ROBERT M. BRICK
BY
Mason, Porter, Diller & Stewart,
ATTORNEYS Dec. 29, 1964 C. E. MAIER ETAL 3,162,907
APPARATUS FOR THE PRODUCTION OF LAMINATE STRIP
Filed April 4, 1961 3 Sheets-Sheet 3
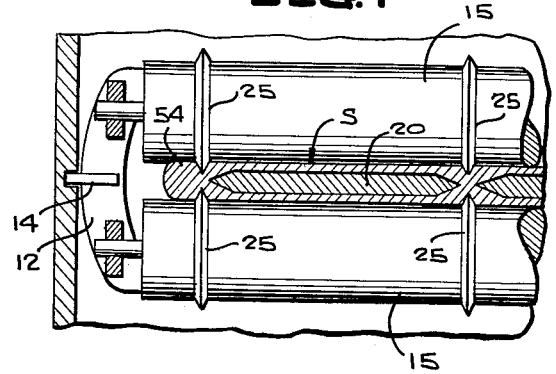
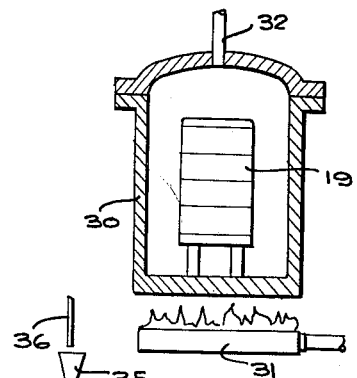
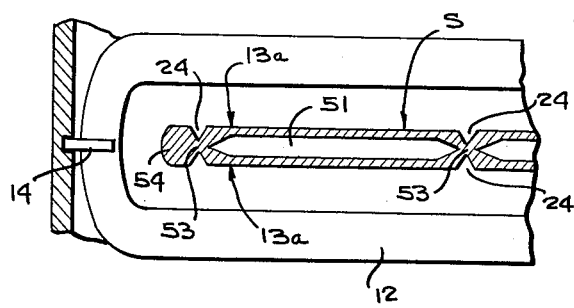
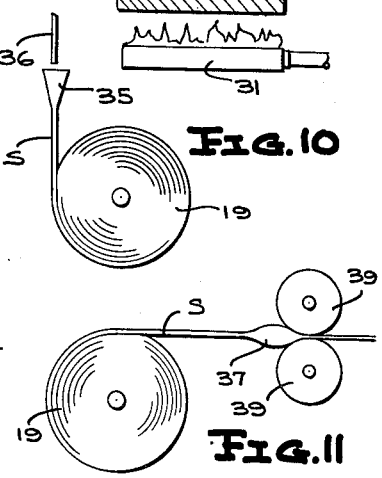
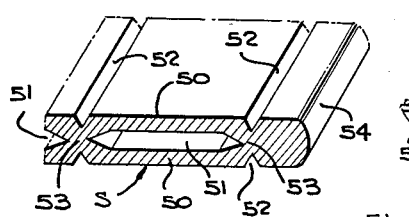
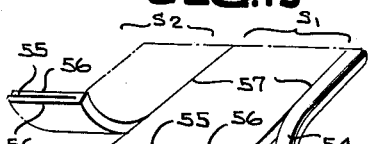
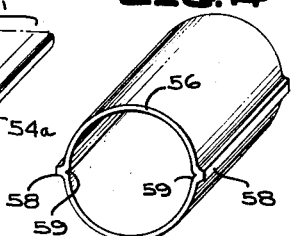
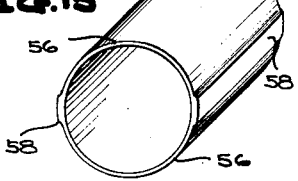
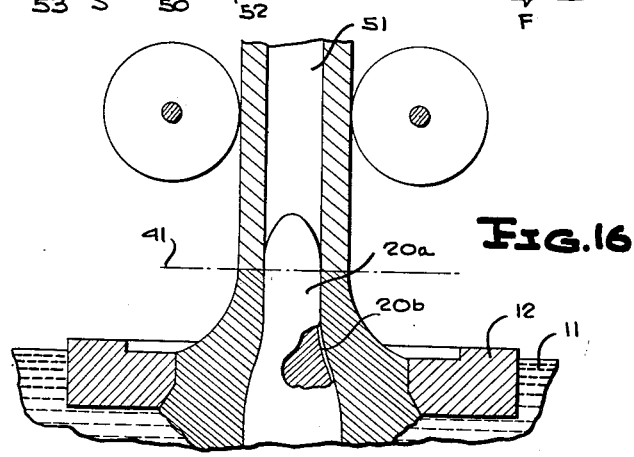
INVENTORS
CURTIS E. MAIER &
ROBERT M. BRICK
BY
Mason, Porter, Diller & Stewart,
ATTORNEYS

United States Patent Office 3,162,907
Patented Dec. 29, 1964

3,162,907
APPARATUS FOR THE PRODUCTION OF
LAMINATE STRIP
Curtis E. Maier, Chicago, and Robert M. Brick, Hinsdale, Ill., assignors to Continental Can Company, Inc., New York, N.Y., a corporation of New York
Filed Apr. 4, 1961, Ser. No. 100,544
12 Claims. (Cl. 22—57.2)

This invention relates to the production of laminate metal stock and is concerned with such production from molten metal by an apparatus which determines a grain structure of the final product.

It is known to provide a pool of molten metal with a float having a slit therein, and to draw a ribbon of the metal upward through the slit, and to cool the metal of the ribbon to provide a metal tape.

According to the instant invention, the apparatus includes core or mandrel devices in the slit whereby laterally spaced internal longitudinal channels are formed in the issuing strip material: and means are provided for forming the strip with external longitudinal grooves located at the non-laminate regions between the channels. Such strips can then be rolled to form a multi-wide stock which may be separated longitudinally into a plurality of single-wide strips each having an internal longitudinal channel enclosed at its laminar faces and at its longitudinal edges by integral metal.

Objects of the invention are apparatus for producing such a strip.

A further object is an apparatus by which such a laminate strip may be formed, and then corrected as to outline and thickness, before the strip is subjected to rolling.

With these and other objects in view, as will appear in the course of the following description and claims, an illustrative embodiment of the invention is shown on the accompanying drawings, in which:

FIGURE 1 is a conventionalized upright section through a drawing apparatus for a multi-wide strip, according to this invention;

FIGURE 2 is a perspective view of a part of a core;

FIGURE 3 is a view of the molten metal pot and its parts, substantially on line 3—3 of FIGURE 1;

FIGURE 4 is a perspective view of part of a shaping float;

FIGURE 5 is an upright sectional view corresponding to a part of FIGURE 1, at an enlarged scale, to show a core structure and the drawing of the metal thereover;

FIGURE 5a is a view corresponding to FIGURE 5, but showing the initial employment of a starter member;

FIGURE 5b is a view corresponding to a part of FIGURE 5, and showing a modified practice;

FIGURE 6 is an upright section, substantially on line 6—6 of FIGURE 5;

FIGURE 7 is a horizontal section, at a larger scale, substantially on line 7—7 of FIGURE 3;

FIGURE 8 is a horizontal section, at the larger scale, substantially on line 8—8 of FIGURE 3;

FIGURE 9 is a conventionalized section through a heat-treating device;

FIGURE 10 is a view showing the introduction of an anti-welding or resist material into the drawn strip, preparatory to rolling the same;

FIGURE 11 is a conventionalized view showing the rolling of the withdrawn strip;

FIGURE 12 is a perspective view showing a part of the multi-wide strip as drawn from the molten metal bath;

FIGURE 13 is a perspective view of a part of a rolled multi-wide strip, with two adjacent single-wide strips being separated;

FIGURE 14 is a perspective view showing the effect of dilation or expansion of a blank cut from a single-wide strip;

FIGURE 15 is a perspective view showing the effect of conforming the fins present in FIGURE 14;

FIGURE 16 is a view corresponding to FIGURE 5, showing a modified practice.

In the drawings, FIGURES 1–8, a pot 10 contains a bath 11 of molten metal. A float 12 on the surface of the molten metal has a slit 13 (FIGURE 4) and can be held against horizontal movement by the members 14 on the float and moving in upright grooves in the walls of the pot 10. During a continuous operation, the molten metal is drawn upward through the slit 13 by its cohesion to the part of the strip S already drawn. A drawing and thinning occurs during the early stage of the upward movement, as shown by the reduction of thickness of the ascending mass M in FIGURES 1 and 5. The mass then passes between the driven chilling rolls 15 which are journaled on arms 16 pivoted on a fixed frame 17 and urged toward the strip S as by springs 18. The pressure by the rolls 15 against the ascending strip S assures good heat-transfer and guiding contact without deformation of the strip: and can be 100 pounds per square inch for aluminum. The metal of the strip has essentially solidified into a strip S before it leaves the rolls 15, and can then be formed into a coil 19.

According to this invention, the pot 10 has a plurality of cores or mandrels 20 (FIGURES 1, 2, 3, 5, 6, 7 and 8) secured at the floor thereof and extending upward into the slit, for forming internal longitudinal channels 51 in the strip as it is withdrawn from the pot. FIGURE 2 shows such a core, with wide flat parallel faces 21 connected by edges 22 which are of chisel-shaped section. A plurality of such cores are provided, for example, six being shown in FIGURE 3, mounted in edge-spaced parallel relation essentially in a plane extending along the slit 13 and spaced (FIGURE 8) from the longer lip edges 13a thereof. These cores extend upward to points above the upper edge of the float 12, as shown in FIGURE 5, and thus are engaged with the ascending metal until the same has solidified adjacent the cores to a condition for thereafter maintaining the longitudinal channels 51 which have thus been formed in the ascending mass.

When the invention is employed, as in the illustrative form, for making multi-channel or multi-wide strip material which is later to be separated longitudinally into a plurality of single-wide strips, the float 12 is preferably provided with upright ribs 24 (FIGURES 4 and 8) which project into the slit 13 at horizontal spacings determined by the widths of the single-wide strips to be formed, and so that pairs of such ribs (FIGURE 8) are aligned opposite the spaces between each two cores 20: that is, the grooves are formed at the metal portions 53 between two adjacent cores or at the outer edges of the cores which are at the edges of the strip S. Correspondingly (FIGURE 7), the rolls 15 are formed with spaced peripheral ribs 25 for engaging in and completing the shaping of the external longitudinal grooves formed in the multi-wide strip S by the aforesaid ribs 24. In general, due to the contraction of metal as it cools, the width of the strip S will decrease from the liquid level to the point at which it attains room temperature. The ribs 25 can be correspondingly more closely spaced across the width of the strip than the spacing of the ribs 24, as shown with exaggeration for definiteness in FIGURE 3, where the strip width decreases from the float 12 to the rolls 15 and the grooves 52 correspondingly converge toward one another. The cores or mandrels 20 are likewise tapered, and coverage toward one another. Since the strip has been greatly cooled when it reaches the rolls 15, there is little further decrease in strip width thereabove. The amount of thermal contraction is known or easily predetermined for specific metals and the preselected liquidus temperature and cooling effect of the rolls 15; and therewith the dimensions can be ascertained for employment. In operation, the rolls 15 maintain the momentarily contacting part of the strip at a constant temperature.

The bodies of the cores 20 are made of metal which is strong at the temperature of the molten metal of bath 11, and preferably not wetted by such metal: for example of 16–25–8 stainless steel for molten aluminum and its alloys. For steel and stainless steel, the core bodies can be of tungsten. Preferably, the portions of the cores which are presented for contact by molten metal have a refractory coating 20b, e.g., of flame-sprayed aluminum oxide.

It is preferred to employ internal rollers 26 within each channel (FIGURES 2, 5 and 6) opposite the chilling rolls 15, to resist collapse of the lamination walls of the channels. For this, the core 20 can have a slot 27 which closely receives the rolls 26 so these rolls have their surfaces in contact to resist the inward pressures of the two strip channel walls. Closely beneath these rolls 26 but above the liquidus:solidus region of the ascending strip S, a pair of bevel-edge rolls 28 are mounted in each core 20, for assuring the internal shaping of the channel edges, with their outer edges spaced horizontally by the distance for determining the width of the channel at the prevailing temperature and so that upon cooling, the channel has a predetermined final width. When the channel thickness is to be very small, the rolls 26 may be proportionately larger relative to the channel thickness, by mounting their axes at different levels, as shown in FIGURE 5b. The ascent of the strip S tends to drag the face-forming rolls 26 with it. The effect of the various forces upon the strip, in the form of FIGURE 5b, can be to cause a bending of the strip because the axes of rolls 15, 26 are not in a single plane: with the external rolls 15 of a diameter so that, at the level of the axis of the upper roll 26, the horizontal distance of the outer-surface of the strip nearest this roll 26 to the periphery of the adjacent roll 15 is small compared to the wall thickness of the strip, and with the rolls 26 symmetrically above and below the horizontal plane of the rolls 15, this bending is minor. The bending effort, with the form of FIGURE 5b, is preferably so directed that it predisposes the strip to pass around a turning roll such as 43 in FIGURE 1, and to enter a coil 19.

The coil 19 may be subjected to heat treatment in a chamber 30 (FIGURE 9) which is externally heated as shown by the burner pipe 31. The chamber 30 may receive an atmosphere of gas through the pipe 32, to avoid formation of surface oxide.

The end 35 of the strip S in coil 19 is then drawn out (FIGURE 10) and the channel walls spread apart so that an anti-welding resist can be introduced, as by a conduit 36. Suitable resists are liquefiable organic compounds as set out and more fully described in patent application, Serial No. 44,148, filed July 20, 1960. Anti-welding resist is also placed in each external groove. The channel walls are brought together, and the end of the strip pinched shut and introduced into a stand of metal rolls 39 (FIGURE 11) which act to reduce the thickness and extend the length of the strip. The resist can initially form a swelling in the strip, shown exaggeratedly at 37 in FIGURE 11; and is caused to flow along the strip as it advances into the nips of the rolls, but leaves a residual layer or film which holds the surface laminations apart and prevents their becoming welded together generally or locally.

The strip S in passing from the rolls 15 may have a cross-section as shown by the portion in FIGURE 12, where the laminar portions 50 have been formed externally by the withdrawing through the slit 13 and by the action of the rolls 15 and internally by the action of the cores 20, and having essentially flat and parallel outer and inner surfaces; the internal channels 51 between the pairs of laminar portions 50 having the inner surfaces converging corresponding to the chisel-like edges on the cores 20. Externally, the strip S has longitudinal grooves 52 located in alignment with the integral metal 53 present between the edges of each two adjacent channels 50. It is preferred to form the multi wide strip S of greater width than the total of the single-wide strips to be formed, by providing edge extensions 54 along which may likewise be provided longitudinal grooves 52.

Upon rolling the strip S of FIGURE 12, the final strip F is formed (FIGURE 13). The internal resists in the channels 51 now provide a thin inter-film 55 between the surface laminations 56: and the rolling has served to close the grooves 52 until the faces of the strip are essentially flat, but with the external resist residue present in alignment with the integrating metal located beween the edges of adjacent internal resist films 55 as shown by the lines 57. These weakenings permit the edge portions 54a to be torn away along planes accurately determined by the corresponding weakenings; and permit adjacent single-wide strips to be separated from one another by overstressing the metal between the inner edges of the external resist residues; as shown by the deflecting of the edge portion 54a and the single-wide strip S–2 out of the plane of the single-wide strip S–1.

The strips can be severed to produce individual blanks; and then opened, e.g., by introducing a sharp edged tool at the internal resist residue 55 of the blank, and then moving the laminations 56 apart, e.g., to form a cylindrical tube (FIGURE 14) having diametrically opposite projecting fins 58 of integrating metal and with the edges of the internal resist residue at re-entrant angles 59. The fins 58 can be pressed inward while supporting the internal surface by a suitably shaped anvil, after trimming their projectional dimensions, if desired, to provide a final tubular structure (FIGURE 15) having essentially smooth and regular external and internal surfaces, with the re-entrant angles essentially invisible: such a structure can be flanged and provided with ends to form a can or like container.

In an illustrative practice with the apparatus of FIGURES 1–8, the molten metal for forming the strip may be 5052 aluminum alloy (aluminum with 2.5% magnesium and 0.25 chromium) which has a liquidus temperature of 649 degrees C. and a solidus temperature of 593 degrees C. The pot metal is kept at a temperature of 675±2 degrees C.: and the liquid level closely controlled by constant replenishing as the strip is formed. The float 12 can be of steatite, with the slit 13 about 2 to 5 times as wide as the desired strip thickness: noting that steatite is of lower specific gravity than molten aluminum, is refractory and is not attacked by aluminum, copper, and their allows at the liquidus temperatures. It can be formed with internal cavities to determine the flotation effect. The driven chilling rolls 15 can be of copper, with a smooth chromium plate: and are hollow and provided with water inlets and outlets in known manner. Assuming that the strip S is to have six channels as in FIGURE 3, with each channel 0.300 inch thick, and with the metal laminations each 0.100 inch thick, the slit 13 can be 1.20 inches.

A starter piece 40 (FIGURES 1 and 5a), e.g., of the 5052 alloy and having the same cross-section as the desired strip, that is, of the same outer outline and with internal cavities to pass over the cores 20, is lowered through the chilling rolls 15 into contact with the molten metal within the slit 13. The starter 40 has free air access to its interior by openings 40a. The starter is wetted by the liquid metal. It is then raised slowly by the rotation of rolls 15, and the mass M of liquid metal is drawn upward from the slit 13, adhering by surface tension. This mass moves upward along the cores 20, and its outer surface forms a curve from the lips 13a of the float 12 to the dimension of the strip being formed. At this stage, the starter 40 is being cooled by the rolls 15 and thus it abstracts heat from the mass M; this heat energy moving upward with establishment of a temperature gradient from the bath temperature of 675 degrees C. to a temperature of, say, 500 degrees C. at the level of the rolls 15. Therewith, the metal of mass M is cooled as it moves upward; and attains a liquidus:solidus interface region at the line 41, FIGURE 5, closely below the bevel rolls 28: noting that the temperature at the line 41, for the illustrative case, is 593 degrees C., but that the solid metal still lacks the strength which it has at room temperature.

In passing to the solid state, the metal contracts, and leaves the refractory coatings 20b on the cores 20. As the now-solidified metal strip moves upward from the interface region at line 41, the bevel-edge rolls 28 effect the shaping of the edges of the channel sections; and the metal laminations at the sides of each channel are then engaged by the chilling rolls 15, being supported against collapse by the internal rolls 26 so that positive cooling contact with rolls 15 occurs for the regular transfer of heat thereto. In the illustrative use of 5052 alloy, the internal rolls 26, 28 can be of the above stainless steel: for making strips of steel or stainless steel, tungsten rolls with tungsten carbide bearings are preferred.

As the starter 40 passes above the level of the rolls 15, it can be supported, as by a retracting cable 42, FIGURE 1, until the strip has attained a length for passing around a guide roller 43. The starter is then cut away; and the strip S collected as a coil 19. Since the same sections are involved, a portion of a prior-made strip can be employed as a starter: and the cut away be made below the end of the original starter piece, and the severed portion employed as the starter for the next operation. Alternatively, a starter of another metal can be used, where the metal has the necessary strength at operating temperature and is wetted by the bath metal.

The strip S continues to cool as it moves upward from the rollers 15, and means such as water jets may be employed, so that it can be brought to room temperature. When the strip is relatively thick, e.g., with one or more channels 0.30 inch thick between laminations which are each 0.30 inch thick, the hoist cable 42 can be employed to draw a length of, say, 20 feet, above the chilling rolls 15. A second cable 42 can then be engaged just above the chilling rolls 15 and its upward motion begun. The first cable is then released, and the 20-foot length of the strip is severed. With thinner strips, it is preferred to collect as a coil 19. The winding core for coiling has a diameter selected in known fashion to minimize buckling during the coiling. In each case, the channels are kept open at the leading ends, for gas pressure balancing.

The rate of upward movement by the rolls 15 and cable 42 is controlled so that a temperature gradient is maintained from the rolls 15 downward to the bath metal. If the rate is too slow, the constant cooling effect causes the liquidus:solidus line 41 to be lower, and the strip S is formed thicker for a given metal, bath temperature, and slit width. If the rate is too fast, the liquidus:solidus line 41 is raised, and the surface tension on mass M does not sustain the metal; so that the strip S becomes thinner and may pinch and break. This rate of movement is determined by the cooling effect of the rolls 15, the specific heat of the metal (number of calories to be removed per unit volume per degree of temperature drop), the heat of solidification (number of calories to be removed per unit volume of metal solidified at the given temperature), the thermal conductivity and heat flow along the metal, the temperature of the bath, and the temperature at which the metal has attained solidity. These parameters are constant for a regularly operating apparatus and for a given metal or alloy, but are usually different for other metals and alloys although predictable from the known properties thereof. A useful rate is 1 to 10 feet per minute, noting that this is essentially independent of the width of the strip being drawn.

The liquid level in the pot 10 is maintained constant by supply through a duct 47, FIGURE 1.

The working zone, at which the metal is at high temperature and susceptible to oxidation in air, may be enclosed in a hood 45 having a top gland 46 for passage of the strip; and the hood operated with an inert gas filling, e.g., nitrogen or a noble gas, under a small plenum pressure.

When the strip has been drawn and coiled, the coil 19 (FIGURE 9) can be homogenized, for example, for several hours at about 500 degrees C. It can then be rolled by successive hot and cold stages: and can be recoiled and heated for annealing prior to final cold rolling. For the 5052 alloy, it is desirable to again coil it, and subject it to a heat treatment at about 200 degrees C. for 1 to 4 hours to reduce internal micro-stresses which might lead to stress corrosion and cracking.

In FIGURE 16, the bath-floor supported mandrel 20a extends through the float slit 13 and to a point above the intended liquidus:solidus interface 41. It can be coated with refractory 20b. In this practice, the mandrel or mandrels serve to establish the channels, as the liquid metal is drawn up over them by the starter 40 as before, until the strip is engaged by the chilling rolls 15: whereupon a regular withdrawal rate, with maintenance as before of the bath 11 at a constant level and temperature, causes the metal to be self-sustaining as it passes upward from the mandrels toward the rolls 15: but in general the internal size and surface are less regular than with the practice of FIGURE 5.

The metallurgy of the drawn strip S is characteristic. It does not have its crystals of approximately equal dimensions along the crystal axes, as occurs in the usual ingots. Instead, the grains are much more elongated in the direction of strip length: and a multiplicity of such grains, rather than a mono-crystal form, is present. Furthermore, when the metal is an alloy such as the illustrative 5052 alloy, which freezes over a range of temperatures (in the illustration, between 649 degrees C. and 593 degrees C.), the structure is of solid dendrites (crystals with a tree-like form) and an intermicellar material present as a liquid while the dendrites are forming. As the solidification of a normal ingot proceeds, with a concomitant decrease in volume by the denser packing in the solid crystal as compared to the original liquid, the liquid in the interdendritic spaces is of a composition different from those of the dendrites, and flows in a direction required by the pressure differentials, with the production of so-called "normal segregation" or "inverse segregation" in such normal cast structures. With the present methods, the heat flow and solidification are not progressing in a direction normal to the surface, as usual with slab or continuous casting processes for large sections, but in a direction parallel to the length of the strip, and hence, such usual segregation effects do not arise. The relatively slow solidification while the strip is passing from the bath surface to the chilling rollers permits more interdiffusion between liquid and solid, and between successively deposited increments of solid on the initial skeletonal dendrites, so that a major part of the coring or micro-segregation of dendritic crystals does not occur as usually found in cast structures.

By the procedure, strips S may be drawn with lamination thicknesses of 0.005 to 0.125 inch. In rolling with the organic resists, as in FIGURES 10 and 11, the final thickness of the resist in the rolled strip F (FIGURE 13) may be 0.0001 to 0.001 inch: and even at invisibly thin layers, the laminations do not weld together but can be easily separated. A desirable organic resist for the illustrative 5052 and other aluminum alloys, for pure aluminum, and for copper and copper alloys is a silicone oil, such as that obtained commercially under the Dow-Corning mark DC–710. This also is useful for providing a coating in the longitudinal external grooves 52 as the strip S enters and passes through the roll stands to be reduced to the final strip F with the surface weakenings 57 therein.

What is claimed is:

1. An apparatus for forming a metal strip having a longitudinal internal channel comprising means for providing a bath of molten metal, a float on said bath having a slit greater in width than the desired thickness of the strip, a core mounted in said bath means and extending upward through the slit in spaced relation to the lips thereof, and means above the bath for controlling upward movement of the strip and including cooling rolls for engaging opposite surfaces of the ascending strip and effective to establish a temperature gradient from the bath past a liquidus:solidus zone located between the bath and the cooling rolls.

2. An apparatus for forming a metal strip having a longitudinal internal channel comprising means for providing a bath of molten metal, a float on said bath having a slit greater in width than the desired thickness of the strip, a core mounted in said bath means and extending upward through the slit in spaced relation to the lips thereof, means above the bath for controlling upward movement of the strip and including cooling rolls for engaging opposite surfaces of the ascending strip and effective to establish a temperature gradient from the bath past a liquidus:solidus zone located between the bath and the cooling rolls, and rolls journaled on the core above the liquidus:solidus zone for shaping surfaces of the channel.

3. An apparatus as in claim 2, in which the core has recesses in its edges and a slot extending between its faces substantially at the plane through the axes of the cooling rolls, with a pair of face rolls located in said slot and abutting one another and projecting beyond the core for engaging opposed inner surfaces of the strip channel, and shaping rolls with V-section peripheries journaled in said recesses for shaping the edges of the strip channel.

4. An apparatus for forming a metal strip having a longitudinal internal channel comprising means for providing a bath of molten metal, a float on said bath having a slit greater in width than the desired thickness of the strip, a core mounted in said bath means and extending upward through the slit in spaced relation to the lips thereof, means above the bath for controlling upward movement of the strip and including cooling rolls for engaging opposite surfaces of the ascending strip and effective to establish a temperature gradient from the bath past a liquidus:solidus zone located between the bath and the cooling rolls, and rolls journaled on the core and positioned within the ascending strip between the said cooling rolls.

5. An apparatus for forming a metal strip having a longitudinal internal channel comprising means for providing a bath of molten metal, a float on said bath having a slit greater in width than the desired thickness of the strip, a core mounted in said bath means and extending upward through the slit in spaced relation to the lips thereof, means above the bath for controlling upward movement of the strip and including cooling rolls for engaging opposite surfaces of the ascending strip and effective to establish a temperature gradient from the bath past a liquidus:solidus zone located between the bath and the cooling rolls, said core extending to a level above the liquidus:solidus zone.

6. An apparatus for forming a metal strip having a longitudinal internal channel comprising means for providing a bath of molten metal, a float on said bath having a slit greater in width than the desired thickness of the strip, a core mounted in said bath means and extending upward through the slit in spaced relation to the lips thereof, means above the bath for controlling upward movement of the strip and including cooling rolls for engaging opposite surfaces of the ascending strip and effective to establish a temperature gradient from the bath past a liquidus:solidus zone located between the bath and the cooling rolls, and a plurality of flat cores located in plane arrangement in said slit and spaced from one another in the direction of the length of the slit.

7. An apparatus as in claim 6, in which the float has inwardly projecting vertical ribs for establishing longitudinal external grooves in the strip, said ribs being located opposite the spaces between adjacent cores.

8. An apparatus as in claim 7, in which the cooling rolls have peripheral ribs for engaging in the said grooves of the strip.

9. An apparatus as in claim 7, in which the ribs on the rolls are more closely spaced than the ribs on the float.

10. An apparatus as in claim 6, in which the cores converge upwardly toward one another.

11. An apparatus for forming a metal strip having a longitudinal internal channel comprising means for providing a bath of molten metal, a float on said bath having a slit greater in width than the desired thickness of the strip, a core mounted in said bath means and extending upward through the slit in spaced relation to the lips thereof, means above the bath for controlling upward movement of the strip and including cooling rolls for engaging opposite surfaces of the ascending strip and effective to establish a temperature gradient from the bath past a liquidus:solidus zone located between the bath and the cooling rolls, the core having its width parallel to the direction of the slit and having recesses in its edges, and shaping rollers journaled in said recesses for engaging the edges of the channel and shaping the same and located above the liquidus:solidus zone and below the said chilling rollers.

12. An apparatus as in claim 11, in which the said shaping rollers have peripheries of V-section.

References Cited in the file of this patent
UNITED STATES PATENTS

| | | |
|---|---|---|
| 1,006,600 | Speller | Oct. 24, 1911 |
| 1,028,812 | Cramer | June 4, 1912 |
| 2,543,936 | Reynolds | Mar. 6, 1931 |
| 2,560,639 | Giesler | July 17, 1951 |
| 2,841,846 | Kokichi Otani | July 8, 1958 |
| 2,891,303 | Stevenson | June 23, 1959 |
| 2,966,700 | Dyer et al. | Jan. 3, 1961 |